(12) United States Patent
Molenaar et al.

(10) Patent No.: US 7,475,602 B2
(45) Date of Patent: Jan. 13, 2009

(54) PROCESS FOR MOUNTING A CLAMP-ON FLOW RATE MEASUREMENT DEVICE AND MOUNTING DEVICE FOR ATTACHING A CLAMP-ON FLOW RATE MEASUREMENT DEVICE

(75) Inventors: Marcel Meijlom Molenaar, Dordrecht (NL); Jan Teunis Aart Pors, Oud-Beijerland (NL); Jeroen Van Den Berg, Hendrik Ido Ambacht (NL); Cornelis Johannes Hogendoorn, Spijk (NL)

(73) Assignee: Krohne AG, Basel (CH)

( * ) Notice: Subject to any disclaimer, the term of this patent is extended or adjusted under 35 U.S.C. 154(b) by 55 days.

(21) Appl. No.: 11/552,698

(22) Filed: Oct. 25, 2006

(65) Prior Publication Data
US 2007/0251314 A1 Nov. 1, 2007

(30) Foreign Application Priority Data
Oct. 25, 2005 (DE) .................. 10 2005 051 336

(51) Int. Cl.
*G01F 1/20* (2006.01)
*G01F 15/18* (2006.01)
(52) U.S. Cl. .............. 73/861.18; 73/866.5; 73/273; 73/201
(58) Field of Classification Search . 73/861.18–861.31, 73/866.5, 201, 273; 292/256–258
See application file for complete search history.

(56) References Cited
U.S. PATENT DOCUMENTS
4,242,744 A 12/1980 Rottmar 4,817,901 A 4/1989 Kuo
5,001,936 A * 3/1991 Baumoel ............... 73/861.18
6,397,683 B1 * 6/2002 Hagenmeyer et al. ..... 73/861.18

FOREIGN PATENT DOCUMENTS

| DE | 4430700 | 1/1996 |
|---|---|---|
| DE | 29903652 U1 | 9/1999 |
| FR | 1544404 | 9/1968 |
| GB | 1311021 | 3/1973 |

* cited by examiner

*Primary Examiner*—Edward Lefkowitz
*Assistant Examiner*—Punam Patel
(74) *Attorney, Agent, or Firm*—David S. Safran; Roberts Mlotkowski Safran & Cole, P.C.

(57) ABSTRACT

A process and device for mounting a clamp-on flow rate measurement device on a measurement pipe using a mounting device having a holding strap with catches. The holding strap can be fastened on the measurement pipe by the holding strap being guided into and through the catch and tightened. A holder is attached to the holding strap to which the clamp-on flow rate measurement device can be fastened. First the mounting device is mounted on the measurement pipe, afterwards the clamp-on flow rate measurement device is attached to the holder without the holding strap being completely tensioned, so that the clamp-on flow rate measurement device is loosely held on the measurement pipe. Then, after aligning the clamp-on flow rate measurement device is, the clamp-on flow rate measurement device is completely attached to the holding means by further tensioning of the holding strap by lifting the catch off the measurement pipe.

8 Claims, 4 Drawing Sheets

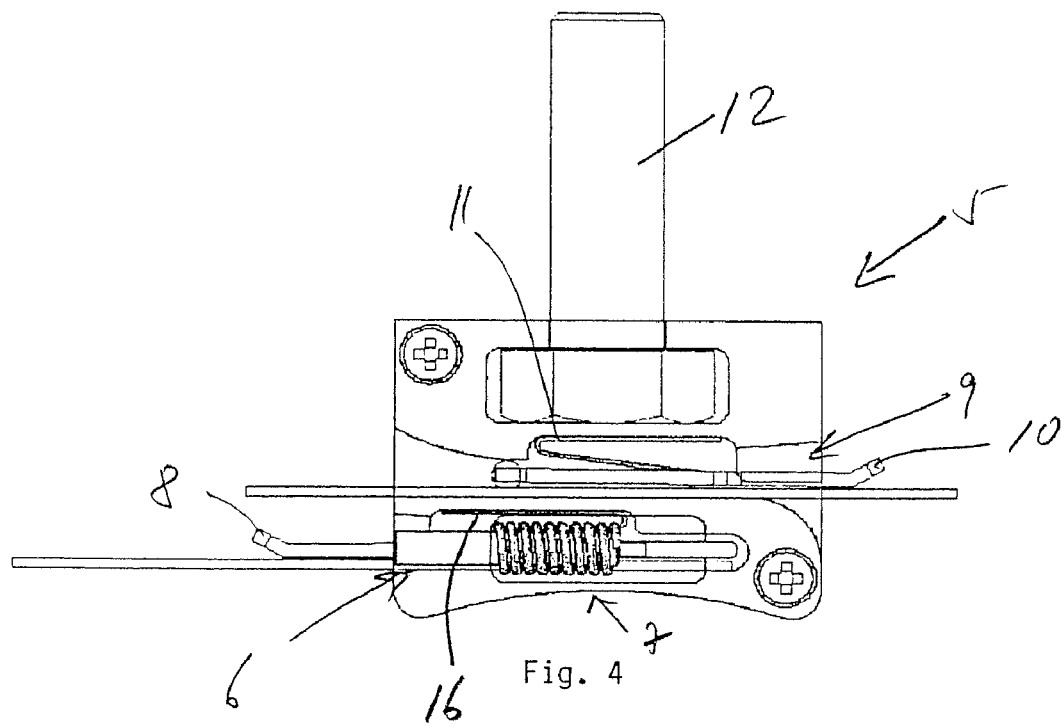
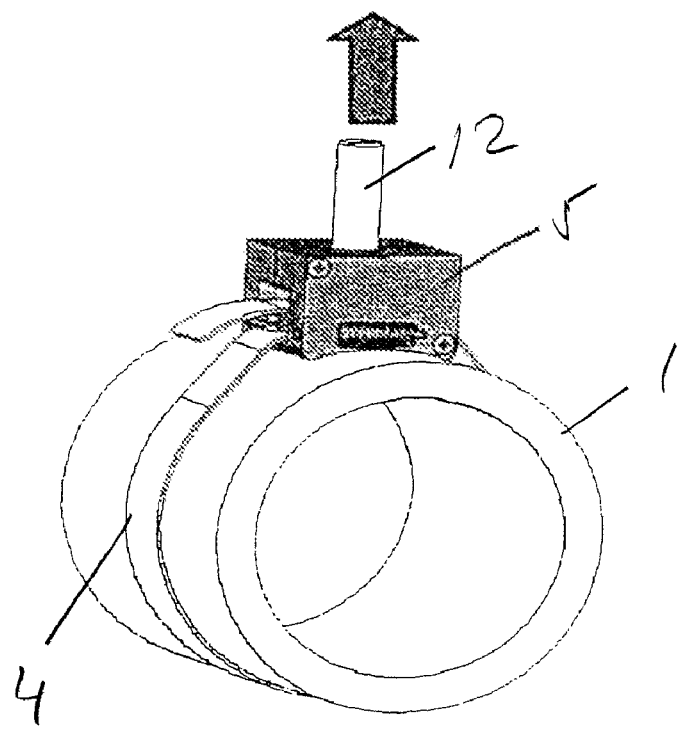
Fig. 4
Fig. 5

PROCESS FOR MOUNTING A CLAMP-ON FLOW RATE MEASUREMENT DEVICE AND MOUNTING DEVICE FOR ATTACHING A CLAMP-ON FLOW RATE MEASUREMENT DEVICE

BACKGROUND OF THE INVENTION

1. Field of the Invention

The invention relates to a process for mounting of a clamp-on flow rate measurement device on a measurement pipe through which a fluid can flow and a mounting device for attachment of a clamp-on flow rate measurement device.

2. Description of Related Art

A conventional mounting device consists, for example, of a cable binder which can be used as an additional means to attach a clamp-on means to a pipe through which a fluid can flow as the carrier. For pipes through which a fluid is flowing, it is often desirable to determine the flow rate of the fluid so that, especially, clamp-on flow rate measurement devices, such as clamp-on ultrasonic flow rate measurement devices, are suitable as clamp-on means. As the catching of the holding strap, there are various possibilities, such as providing a sawtooth profile or a perforation of the holding strap at typically equidistant spacings with recesses which the catch element of the catch means can engage.

In clamp-on flow rate measurement devices, what is important is that they can be easily placed on existing pipelines. Therefore, it is not necessary to cut out a piece from the pipe in existing pipelines in order to be able to insert a separate flow rate measurement device. This makes clamp-on flow rate measurement devices versatile and easy to use.

When mounting such a clamp-on flow rate measurement device on a pipe by means of cable binders, there is a significant problem in that the alignment and attachment of the device is complex and difficult. If this task is to be performed by one operator alone, often the "third" hand is lacking, i.e., the measurement device can only be correctly aligned and fixed with difficulty or with the aid of another operator. In addition to only unsatisfactory alignment, is it moreover problematical in the use of cable binders for attachment of a clamp-on means that the holding force necessary for the respective device cannot always be ensured in all situations and detachment of the clamp-on means is only possible with destruction of the cable binders.

SUMMARY OF THE INVENTION

Against the background of the above described problem, an object of the invention is to devise a process for attachment of a clamp-on flow rate measurement device to a measurement pipe though which a fluid can flow, and a corresponding mounting device which can be used easily by a single operator alone to mount a clamp-on flow rate measurement device correctly aligned and reliably held on a measurement pipe.

This object is achieved by a process for mounting a clamp-on flow rate measurement device on a measurement pipe through which a fluid can flow by means of a mounting device, the mounting device having a holding strap which is provided with catches with one free end and one end to which a catch means is attached, the holding strap and the catch means being made such that the holding strap can be fastened to the measurement pipe by the holding strap being guided into and through the catch means and the holding strap which has been routed around the measurement pipe being pulled tight, a catch element provided in the catch means interacting with the catches of the holding strap, and in doing so, ensuring that the holding strap cannot become loose again, there being a holding means which is attached to the holding strap and to which the clamp-on flow rate measurement device can be fastened, first the mounting device being attached to the measurement pipe, afterwards the clamp-on flow rate measurement device being attached to the holding means without the holding strap being completely tensioned, so that the clamp-on flow rate measurement device is held on the measurement pipe, but is not completely fixed on it, and afterwards, the clamp-on flow rate measurement device being aligned, and then, the clamp-on flow rate measurement device being completely attached to the holding means by the holding strap being completely tensioned by lifting the catch means off the measurement pipe so that the clamp-on flow rate measurement device is held and fixed on the measurement pipe.

Furthermore, this object is substantively achieved by a mounting device for mounting a clamp-on flow rate measurement device on a measurement pipe through which a fluid can flow, the mounting device having a holding strap provided with catches with one free end and one end to which a catch means is attached, the holding strap and the catch means being made such that the holding strap can be attached to the measurement pipe by the holding strap being guided into and through the catch means and the holding strap which has been routed around the measurement pipe being pulled tight on the measurement pipe, a catch element provided in the catch means interacting with the catches of the holding strap, and in doing so, ensuring that the holding strap cannot become loose again, there being a threaded rod which is attached to the holding strap and to which the clamp-on flow rate measurement device can be fastened, the clamp-on flow rate measurement device being mountable on the measurement pipe by a screw means which can be screwed onto the threaded rod, and the holding strap can be completely tensioned by the screw means being screwed onto the threaded rod, and in doing so, acting on the clamp-on flow rate measurement device, for which the measurement pipe, for its part, is provided as a support so that the catch means is lifted off the measurement pipe, by which the clamp-on flow rate measurement device is held and fixed on the measurement pipe.

In accordance with the invention, it is therefore provided that the holding strap of the holding means fastens the device to be mounted on the measurement pipe, not directly to it, but by means of a holding device which is attached to the holding strap. In accordance with the invention, thus, the attachment of the holding strap to the measurement pipe, on the one hand, and the attachment of the device to the mounting device, on the other hand, are separate from one another.

This has the advantage that these two attachments can be manipulated and fixed independently of one another; this makes it possible to mount the device on the measurement pipe without also fixing it right away. This means that the device can be "loosely" mounted on the measurement pipe in a first step, so that it cannot become loose again, but remains movable on the measurement pipe in order to then align the device in a second step and finally to fix it, so that its alignment is also fixed on the measurement pipe and the device can no longer be easily moved.

According to the invention, it is provided that the holding means is made such that the holding strap is tensioned when the device is attached to the holding means. This means that the holding strap which has been routed around the measurement pipe and which has been pulled tight on the measurement pipe when the device is attached to the holding means experiences an additional force, specifically a tensioning force so that, finally, fixing of the mounting device and the device jointly on the measurement pipe is achieved.

Various types of mounts are used as holding means. According to one preferred development of the invention, it is provided that the holding means is a rod, preferably a threaded rod. When a threaded rod is provided as the holding means, according to one preferred development of the invention, it is also provided that the device can be mounted on the measurement pipe by a screw means which has been screwed onto the threaded rod. In this respect, manually actuated or tool actuated nuts have proven effective; they have a relatively large bearing surface, with which they act on the device for its attachment.

Tensioning of the holding strap can be achieved with different means. According to one preferred development, it is provided that, to tension the holding strap, the screw means acts on the device for which, for its part, the measurement pipe is intended as a support abutment. This means that during attachment, specifically, screwing the device onto the measurement pipe, in the course of screwing the screw means tight, the holding strap is raised essentially radially outward off the measurement pipe so that it is additionally tensioned. With sufficient tensioning, finally, secure fixing of the device on the measurement pipe is achieved.

In particular, there is a host of possibilities for embodying and developing the mounting device and the process of the invention. For this purpose, reference is made to the following detailed description of a preferred embodiment of the invention with reference to the drawings.

BRIEF DESCRIPTION OF THE DRAWINGS

FIG. 4 is a side sectional view that shows the catch means according to the preferred embodiment of the invention, and FIG. 5 schematically shows the mounting principle of the mounting device according to the preferred embodiment of the invention.

DETAILED DESCRIPTION OF THE INVENTION

Figure 1:
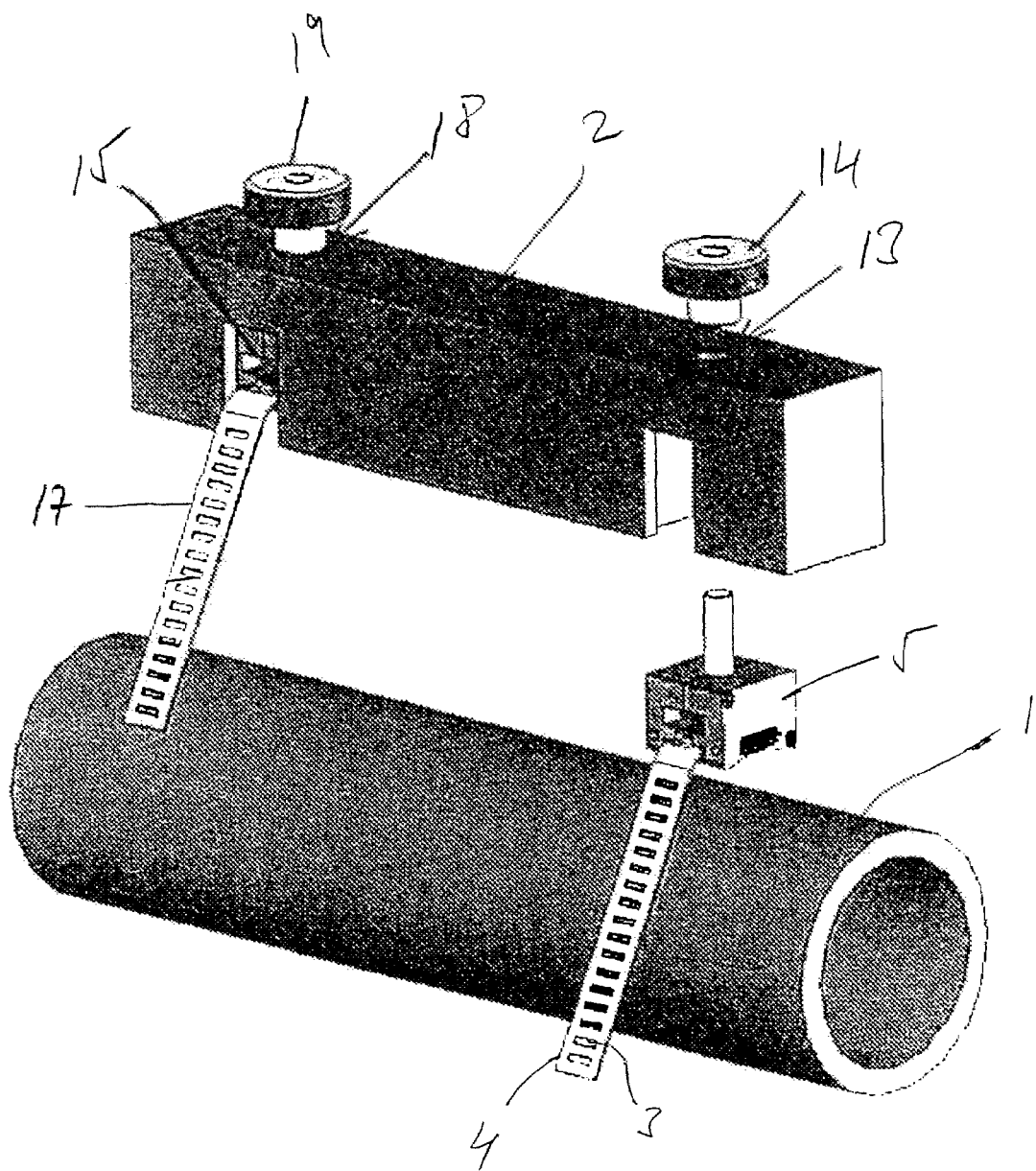
FIG. 1 shows a mounting device according to a preferred embodiment of the invention for use for a clamp-on flow rate measurement device.

FIG. 1 shows a mounting device according to one preferred embodiment of the invention which is used to mount an ultrasonic flow rate measurement device of the clamp-on type on a measurement pipe 1. Thus, the measurement pipe 1 is the carrier on which the clamp-on flow rate measurement device is to be mounted as an accessory means. Of the clamp-on ultrasonic flow rate measurement device, here, only the housing 2 is shown which is used as a receiver and lengthwise guide for two ultrasonic transducers which are not further shown here.

Figure 3:
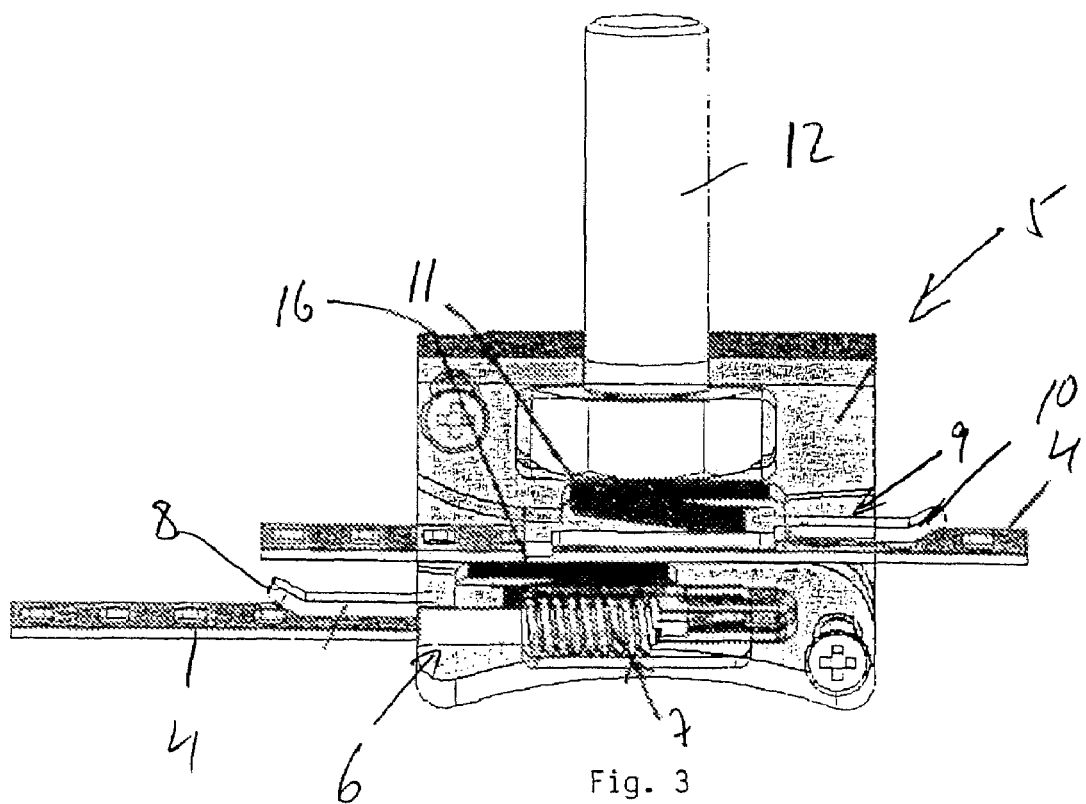
FIG. 3 is a perspective partial cross-sectional view of the catch means of the mounting device according to the preferred embodiment of the invention.

The housing 2 of the clamp-on ultrasonic flow rate measurement device on the measurement pipe 1 is mounted in the following steps:

First, a holding strap 4 provided with catches 3 is attached to the measurement pipe 1, by a catch means 5 into which one end of the holding strap 4 is inserted from one side, as can be taken, for example, from FIGS. 3 & 4. For the catch means 5, these figures show a bottom recess 6 which is accessible from the left side of the catch means 5 and into which one end of the holding strap 4 is inserted and is locked there by means of a catch mechanism. This catch mechanism, among others, has a spring mechanism 7 and a lever 8 on which an essentially V-shaped leaf spring 16 acts from above.

Figure 2:
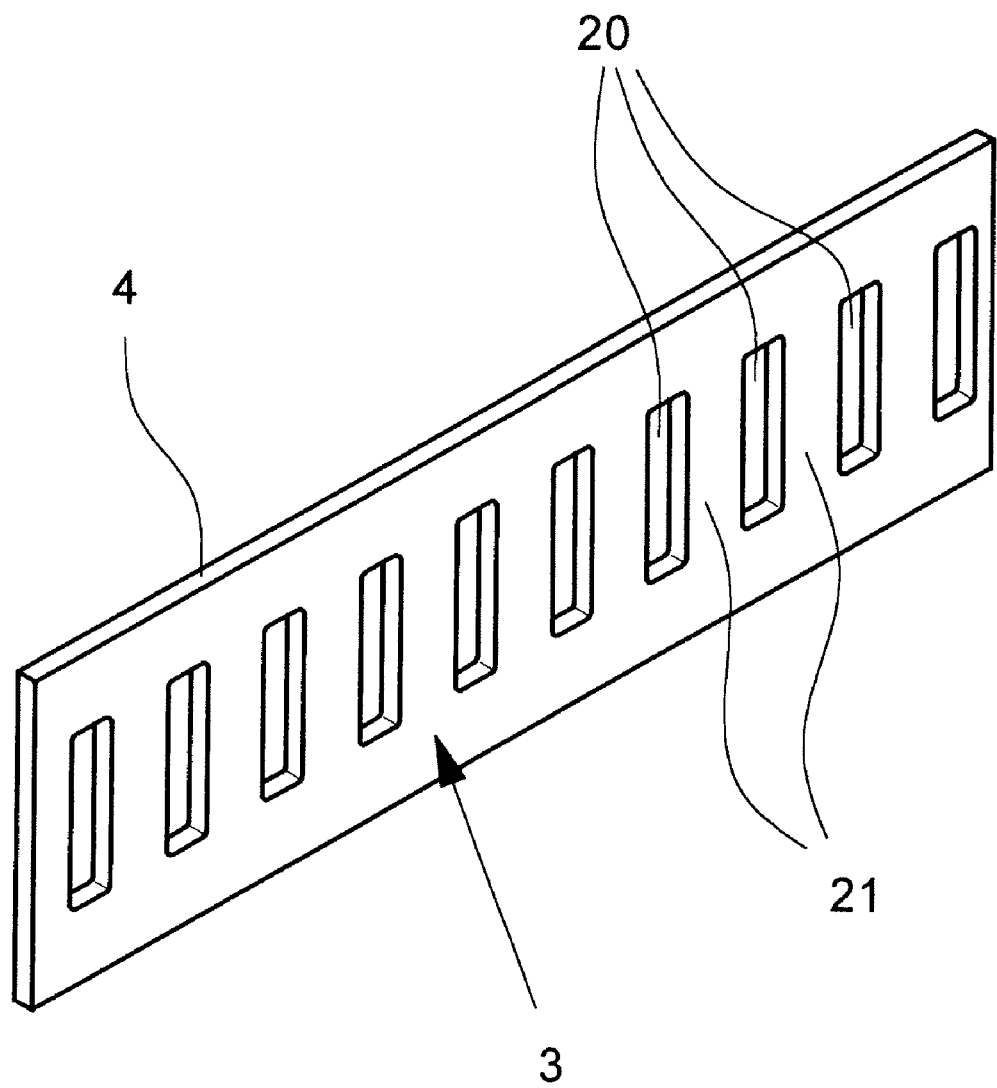
FIG. 2 shows the holding strap of the mounting device according to the preferred embodiment of the invention in detail.

The spring mechanism 7 enables a certain movement of the holding strap 4 in the catch means 5; among others, this compensates for the fact that there are catches 3 in the holding strap 4 with a finite spacing, as can be taken from FIG. 2. It is also shown there that the holding strap 4, at equal distances, has slots 20 with a width smaller than the distances 21 of the slots to one another; the slots 20 form the catches 3 in the illustrated embodiment. In this way, high stability of the holding strap 4 is achieved.

The other end of the holding strap 4 is now routed around the measurement pipe 1 and then into the catch means 5 from the other side. For this purpose, the catch means 5 in which the other end of the holding strap 4 is inserted has a through recess 9 above the recess 6 in which, likewise, a catch mechanism acts, specifically, there is another lever 10 on which a catch element, which is not further shown, is located and which interacts with the slots 20 of the catches 3 of the holding strap such that the holding strap 4 which has been inserted into the recess 9 cannot detach again when tightened. For this purpose, an essentially V-shaped leaf spring 11 presses on the lever 10 from above, and thus, on the catch element, which thus engages one of the slots 20 of the holding strap 4 and is held there by the spring force of the leaf spring 11.

In this way, the catch means 5 is mounted on the measurement pipe 1 by means of the holding strap 4, first only "loosely," therefore such that the catch means 5 cannot fall off the measurement pipe 1 again, but remains on it with the capacity to move both in the lengthwise direction and also peripherally.

As the holding means for the housing 2 of the clamp-on ultrasonic flow rate measurement device which is to be mounted, there is a threaded rod 12 on the catch means 5. For a catch means 5 which is mounted on the measurement pipe 1 by means of the holding strap 4 this threaded rod 12 projects radially outward. By means of this threaded rod 12, at this point, the housing 2 of the clamp-on ultrasonic flow rate measurement device can be mounted on the measurement pipe 1 as follows:

The housing 2 has a hole 13 by means of which it can be placed on the threaded rod 12 and thus rests in the lengthwise direction on the outside of the measurement pipe 1. In order to mount the housing 2 on the measurement pipe 1, there is a knurled nut 14 which can be screwed onto the threaded rod 12, and in doing, so presses on the top of the housing 2. This knurled nut 14 can first only be tightened to such an extent that the catch means 5 with the holding strap 4, together with the housing 2 attached thereto, remains movable on the measurement pipe 1, specifically can be pushed both peripherally and also in the lengthwise direction. In this way, correct alignment of the housing 2 on the measurement pipe 1 can take place without the danger of the housing 2 falling off the measurement pipe 1 again.

The housing 2 which is attached to the measurement pipe 1, as shown in FIG. 1, now has a second catch means 15 with a threaded rod which is not further visible as the holding means and with a holding strap 17 for fastening to the measurement pipe 1. In this connection, the threaded rod is routed through a second hole 18 in the top of the housing 2 and is held there by means of a second knurled nut 19.

After the second holding strap 17 has likewise been routed around the measurement pipe 1 and into the second catch means 15, the housing 2 is finally aligned and fixed so that it can no longer be easily moved. This fixing takes place by the knurled nuts 14, 19 being tightened after the holding straps 4, 17 have been routed through the catch means 5, 15 as far as possible.

As can be schematically taken from FIG. 5 in which, for the sake of clarity, the knurled nuts and the housing are omitted, by tightening the knurled nuts, the catch means 5 is raised so that, overall, a tensioning force is applied which leads to tensioning of the holding strap 4. This ultimately ensures secure seating of the housing 2 on the measurement pipe 1.

In addition to the ease of installation of the clamp-on ultrasonic flow rate measurement device, according to the described preferred embodiment of the invention, simple detachability is also ensured: By raising the lever 10 of the catch means 5, or a corresponding lever which is not further shown for the second catch means 15, the holding strap 4, 17 can be pulled out of the catch means 5, 15 again. In exactly the same way, the respective holding strap 4, 17 can be detached from the respective catch means 5, 15 by the lever 8 for the catch means 5 or a corresponding lever which is not shown for the second catch means 15 being raised. Thus, the clamp-on ultrasonic flow rate measurement device, for example, for maintenance purposes, can be removed from the measurement pipe 1 without destroying the mounting device.

What is claimed is:

1. Process for mounting a clamp-on flow rate measurement device on a measurement pipe through which a fluid can flow, comprising the steps of:

preliminarily attaching a mounting device having a holding strap and a catch means for engaging the holding strap by guiding the holding strap into and through the catch means after the holding strap has been routed around the measurement pipe and pulled tight without being securely fixed on the pipe, a catch element in the catch means interacting with catches of the holding strap, after the mounting device has been attached to the measurement pipe, attaching a fastening means of the clamp-on flow rate measurement device to a holding means on the catch means of the mounting device without the holding strap being completely tensioned, so that the clamp-on flow rate measurement device is held on the measurement pipe, but is not completely fixed on it, then aligning the clamp-on flow rate measurement device on the measurement pipe, and then completely attaching the mounting means and clamp-on flow rate measurement device to the pipe by fully tensioning the holding strap by using the fastening means to lift the catch means off the measurement pipe so that the clamp-on flow rate measurement device is held and fixed on the measurement pipe.

2. Process as claimed in claim 1, wherein the holding means is a threaded rod.

3. Process as claimed in claim 2, wherein the fastening means is a screw means which can be screwed onto the threaded rod.

4. Process as claimed in claim 3, wherein the holding strap is tensioned by the screw means drawing the catch means toward the clamp-on flow rate measurement device.

5. Mounting device for mounting a clamp-on flow rate measurement device on a measurement pipe through which a fluid can flow, comprising:

a holding strap which is provided with catches on a free end and an second end on which a catch means for holding the strap is attached, the holding strap and the catch means being made such that the holding strap can be fastened on a measurement pipe by the holding strap being guided into and through the catch means, a catch element being provided in the catch means for interacting with the catches of the holding strap, and a holding means for connection of the flow rate measurement device to the mounting device being provided on the catch means.

6. Mounting Device according to claim 5, wherein the holding means comprises a threaded rod connected to the holding strap and to which the clamp-on flow rate measurement device is attachable by a screw means that is screwable onto the threaded rod for tensioning the holding strap by lifting the catch means off of the measurement pipe.

7. Clamp-on flow rate measurement assembly, comprising:
a flow rate measurement device and
a mounting device for mounting of the flow rate measurement device on a pipe through which a fluid can flow;
wherein said mounting device comprises:
a holding strap which is provided with catches on a free end and an second end on which a catch means for holding the strap is attached, the holding strap and the catch means being made such that the holding strap can be fastened on a measurement pipe by the holding strap being guided into and through the catch means, and a catch element being provided in the catch means for interacting with the catches of the holding strap; and
a holding means provided on the catch means for connection of the flow rate measurement device to the mounting device;
wherein the flow rate measurement device comprises a fastening means for connection to the holding means of the mounting device.

8. Clamp-on flow rate measurement assembly according to claim 7, wherein the holding means comprises a threaded rod connected to the holding strap and wherein the fastening means comprises a screw means that is screwable onto the threaded rod for tensioning the holding strap by lifting the catch means off of the measurement pipe by drawing the catch means toward the flow rate measurement device.

* * * * *